United States Patent
Gallus

(10) Patent No.: US 12,281,680 B2
(45) Date of Patent: Apr. 22, 2025

(54) INSTALLATION SPACE-SAVING AND SAFE CONTROL UNIT FOR THE ELECTROHYDRAULIC ACTUATION OF MOTOR VEHICLE ASSEMBLIES

(71) Applicant: Schaeffler Technologies AG & Co. KG, Herzogenaurach (DE)

(72) Inventor: Tobias Gallus, Altschweier (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/567,908

(22) PCT Filed: May 10, 2022

(86) PCT No.: PCT/DE2022/100355
§ 371 (c)(1),
(2) Date: Dec. 7, 2023

(87) PCT Pub. No.: WO2022/258103
PCT Pub. Date: Dec. 15, 2022

(65) Prior Publication Data
US 2024/0271670 A1 Aug. 15, 2024

(30) Foreign Application Priority Data
Jun. 9, 2021 (DE) .................... 10 2021 114 788.3

(51) Int. Cl.
*F16D 48/06* (2006.01)
*F16D 25/00* (2006.01)
*F16H 61/00* (2006.01)

(52) U.S. Cl.
CPC .......... *F16D 48/066* (2013.01); *F16D 25/00* (2013.01); *F16H 61/0003* (2013.01);
(Continued)

(58) Field of Classification Search
CPC ... F16H 61/0003–0009; F16H 61/0276; F16H 2061/0281; F16D 48/066; F16D 25/00; F16D 2500/1027; F16D 2500/501
See application file for complete search history.

(56) References Cited

U.S. PATENT DOCUMENTS

| | | | |
|---|---|---|---|
| 5,895,027 A * | 4/1999 | Yagi | F16K 27/003 137/884 |
| 6,530,856 B1 * | 3/2003 | Kakiage | H05K 5/0026 74/606 R |
| 2020/0340594 A1 | 10/2020 | Kehl | |

FOREIGN PATENT DOCUMENTS

| | | | |
|---|---|---|---|
| DE | 19919538 A1 * | 11/2000 | ......... F16H 61/0009 |
| DE | 10337197 A1 * | 3/2005 | ......... F16K 31/0675 |

(Continued)

*Primary Examiner* — James J Taylor, II
(74) *Attorney, Agent, or Firm* — Matthew V. Evans

(57) ABSTRACT

The disclosure discloses a control unit for electrohydraulic actuation of motor vehicle assemblies, having a main housing and at least one valve unit which can be inserted into the main housing. The valve unit has a metal valve housing for receiving an electrically actuable valve, a plug housing which is fastened to the valve housing and is formed from a plastics material, and a connection contact which is received in the plug housing and can be electrically connected to the valve. A clamping contact for electrically connecting the connection contact of the valve unit to an actuating electronics system is connected to the main housing. The plug housing forms a dielectric resistance between the clamping contact and the valve housing. An installation space-saving and safe control unit is rendered possible owing to the fact that the plug housing forms a dielectric resistance between the clamping contact and the valve housing.

19 Claims, 1 Drawing Sheet

(52) U.S. Cl.
CPC ............... *F16D 2500/1027* (2013.01); *F16D 2500/501* (2013.01); *F16H 61/0009* (2013.01)

(56) References Cited

FOREIGN PATENT DOCUMENTS

| | | |
|---|---|---|
| DE | 102005058843 A1 | 7/2006 |
| DE | 102012208662 A1 | 12/2012 |
| EP | 2110561 B1 | 5/2011 |
| JP | 2017116025 A | 6/2017 |

* cited by examiner

INSTALLATION SPACE-SAVING AND SAFE CONTROL UNIT FOR THE ELECTROHYDRAULIC ACTUATION OF MOTOR VEHICLE ASSEMBLIES

CROSS-REFERENCE TO RELATED APPLICATIONS

This application is the U.S. National Phase of PCT Application No. PCT/DE2022/100355 filed on May 10, 2022, which claims priority to DE 10 2021 114 788.3 filed on Jun. 9, 2021, the entire disclosures of which are incorporated by reference herein.

TECHNICAL FIELD

The disclosure relates to an electrohydraulic control unit, for example for actuating a clutch of a motor vehicle, which can be operated safely with a small installation space requirement.

BACKGROUND

An electrohydraulic control unit is known from DE 10 2005 058 843 A1, in which valve units inserted laterally into a main housing in an insertion direction are secured by a locking plate and the valve units have a plug projecting perpendicular to the insertion direction for electrical contacting.

There is a constant need to reduce the installation space requirement for control units without compromising electrical safety.

SUMMARY

It is the object of the disclosure to show measures that make possible a safe control unit which saves installation space.

The object is achieved by a control unit having the features described herein.

One embodiment relates to a control unit for the electrohydraulic actuation of motor vehicle assemblies, in particular clutches, having a main housing and at least one valve unit which can be inserted into the main housing. The valve unit has a metal valve housing for receiving an electrically actuated valve, a plug housing which is fastened to the valve housing and is formed from a plastics material, and a connection contact (or a first electrical contact) which is received in the plug housing and can be electrically connected to the valve. A clamping electrical contact (or a second electrical contact for electrically connecting the connection contact (first electrical contact) of the valve unit to an actuating electronics system provided for operating the valve is connected to the main housing, and the plug housing forms a dielectric resistance between the clamping contact and the valve housing.

The control unit can be installed to a surrounding structure in a motor vehicle in an assembly direction. For example, the main housing has a projecting fastening flange that can be bolted or clipped to the surrounding structure in the assembly direction. In particular, the control unit can be part of a hydraulic module for actuating a clutch in a drive train of a motor vehicle, such that the control unit can be installed with respect to an axis of rotation of the clutch to be actuated in an assembly direction extending radially thereto with the surrounding structure. The main housing can have receiving pockets, in particular extending perpendicular to the assembly direction, for receiving the valve housing of the valve unit, which can be inserted into the receiving pockets of the main housing in an insertion direction. In addition, owing to the relative movement of the valve unit relative to the main housing when the valve housing of the valve unit is inserted into the receiving pocket of the main housing, a relative movement of the connection contact of the valve unit to the clamping contact of the main housing can occur simultaneously, which in the designated end position of the valve housing in the receiving pocket, leads to an electrical contacting of the connection contact with the clamping contact. Even if the control unit is already installed in the motor vehicle, a defective valve can be easily disassembled and reassembled by a relative movement of the valve unit to the main housing in the insertion direction. The electrical contacting can be canceled and restored at the same time. This results in a high ease of maintenance of the control unit.

However, this movement kinematics of the valve unit relative to the main housing means that the clamping contact can be arranged in an imaginary extension of the metal valve housing perpendicular to the insertion direction. To minimize the installation space required for the control unit perpendicular to the insertion direction, the clamping contact can be positioned as close as possible to the valve unit and thus also very close to the metal valve housing. However, to prevent a short-circuit current from occurring between the clamping contact and the metal valve housing, a sufficiently large dielectric resistance is formed between the clamping contact and the valve housing, which can safely prevent a current breakdown between the clamping contact and the valve housing at the expected voltages. The dielectric resistance is formed here by the material of the plug housing and not as an air gap, so that a short circuit can be avoided even in the event of vibrations and/or impact-type shocks, which could temporarily shorten the distance between the clamping contact and the valve housing formed by the air gap otherwise provided. Since the material thickness of the plug housing forming the dielectric resistance can provide sufficient voltage protection, adequate electrical protection can be provided even with loose but low-cost manufacturing and assembly tolerances. Since the dielectric resistance is formed by the plug housing and not by the main housing, it is possible to provide the clamping contact freely accessible on a side facing the valve housing of the valve unit, which simplifies the assembly and the electrical contacting of the clamping contact with electrical lines and/or electrical components provided inside the main housing. An installation space-saving and safe control unit is rendered possible owing to the fact that the plug housing forms a dielectric resistance between the clamping contact and the valve housing.

In particular, the valve unit can have a solenoid valve, which is enclosed in the valve housing. For example, a valve solenoid can be provided for actuating a valve slide, with the aid of which a switching position of the valve unit can be switched. The valve slide can be part of the valve unit or, for example, be inserted separately from the valve unit in the main housing. The valve solenoid is designed in particular as an electrically actuated electromagnet.

The valve housing of the valve unit is made of a metallic material, for example steel or aluminum, in order to protect the solenoid valve well from environmental influences. The plug housing of the valve unit, on the other hand, is made of an electrically weak or non-conductive material ("dielectric"), in particular plastic, so that the material of the plug housing can provide the dielectric resistance to an electrical short-circuit current between the clamping contact and the valve housing.

The main housing, made in particular of a plastic, can have a lead frame, with the aid of which the valve unit, in particular the valve solenoid, can be electrically controlled. In particular, the lead frame is part of the main housing, protected from ambient media. The main housing can have a shell-like design and/or enclose a sufficiently large interior space, in which hydraulic lines and electrical lines for operating the at least one valve unit can be provided. In particular, the interior space can be closed and sealed in a liquid-tight and/or gas-tight manner by a bottom element, in particular a two-dimensional flat bottom plate or a three-dimensional bottom shell. The main housing can, for example, have openings extending in the assembly direction in order to allow the main housing and/or the bottom element to be screwed to the surrounding structure via screws aligned in the assembly direction. The bottom element can be fastened, in particular screwed and/or clipped, to the main housing by means of separate fastening means.

In particular, the dielectric resistance extends at least over an entire projection surface of the clamping contact onto the valve housing along a surface normal of an outer side of the valve housing. The dielectric resistance can project laterally beyond the projection surface of the clamping contact so that, within the manufacturing and assembly tolerances, in any tolerance-related relative position, the entire projection surface of the clamping contact is covered by the dielectric resistance provided by the plug housing. The dielectric resistance is thus sufficiently large and voluminous in its two-dimensional shape and its material thickness along a third dimension to be able to provide sufficient voltage protection against short-circuit currents between the clamping contact and the metal valve housing.

In an example embodiment, the valve housing has a cylindrical, in particular substantially circular-cylindrical, outer side, wherein the dielectric resistance extends in a plane tangential to the outer side and substantially parallel to the clamping contact or the dielectric resistance extends in the circumferential direction of the outer side and the clamping contact extends substantially tangential to the dielectric resistance. The dielectric resistance between the substantially cylindrical valve housing and the substantially planar clamping contact can follow, with a substantially constant material thickness, the course of the valve housing or the course of the clamping contact. The valve housing can have a clearance for receiving at least a part of the dielectric resistance, thereby further reducing the installation space. In this manner, a sufficient electrical insulation between the clamping contact and the valve housing can be achieved with the lowest possible use of material for the formation of the dielectric resistance in a cost-effective and resource-saving manner.

In an example embodiment, the plug housing has a projecting insulating extension, guided along an outer side of the valve housing, for forming the dielectric resistance between the clamping contact and the valve housing. The insulating extension can be connected at one end to the rest of the plug housing and project from there into an intermediate region between the clamping contact and the valve housing, filling all or part of the intermediate region. In this regard, it is sufficient that the insulating extension is formed as a substantially web-like extension or partial ring and not as a pipe extension closed in the circumferential direction. The insulating extension can thus form the dielectric resistance only where the dielectric resistance is needed, using only a small amount of material.

The insulating extension can be formed integrally with the rest of the plug housing. In particular, the plug housing can be manufactured by plastic injection molding. The number of components, the assembly effort and the manufacturing costs can thus be kept low. The plug housing can be made in several parts, for example in two parts with a shell and a cover so that the connection contact can be easily mounted in the plug housing. In particular, the cover is firmly connected to the shell, for example by means of adhesive bonding. The insulating extension can be integrally formed with the cover or integrally formed with the shell of the plug housing. Alternatively, the insulating extension can be fastened, for example clipped, as a separate attachment part in a form-fitting and/or force-fitting manner to the rest of the plug housing, in particular to the cover or shell.

In an example embodiment, the insulating extension has a through-opening for the passage of the connection contact outside of an extension of the valve housing imagined in an insertion direction of the valve unit into the main housing and outside of an extension of the valve housing imagined perpendicular to the insertion direction. The through-opening of the insulating extension for the passage of the connection contact from the inside of the plug housing to the outside towards the clamping contact is thus provided at a location which is comparatively far away from the valve housing. The distance between the through-opening and the valve housing can easily be selected to be large enough to prevent a short-circuit between the clamping contact and/or the connection contact on the one hand and the valve housing on the other hand through the through-opening.

In an example embodiment, the insulating extension between the clamping contact and the valve housing can be inserted, in particular, clamped, into the main housing by a relative movement relative to the clamping contact along an insertion direction of the valve unit. For this purpose, a suitable fit can be provided in each case between the insulating extension and the valve housing on the one hand, and between the insulating extension and the clamping contact on the other hand, which still allows the insulating extension to be inserted by hand with or without clamping. This simplifies the assembly.

In an example embodiment, the plug housing is connected to the valve housing in a captive manner by plastic deformation of the valve housing, in particular by flanging with a fastening edge of the plug housing. The metallic material of the valve housing allows for a particularly firm connection of the plug housing to the valve housing without the need for a further separate fastening means. The number of components can thus be kept low.

In an example embodiment, the clamping contact has a groove open in a U-shape for receiving the connection contact in a clamping manner. The groove of the clamping contact is open counter to an insertion direction of the valve unit into the main housing and the connection contact extends outside of the plug housing substantially perpendicular to the insertion direction. The connection contact can, for example, be threaded into the groove via lead-in bevels formed at the edges of the U-shaped groove and frictionally clamped in a narrowed region of the groove. This allows for good mechanical fastening and good electrically conductive contacting between the connection contact of the valve unit and the clamping contact of the main housing.

An example embodiment relates to a hydraulic module for hydraulic actuation of a clutch in a drive train of a motor vehicle. The hydraulic module includes a hydraulic pressure source for actuating the clutch, an actuating electronics system for processing signals for actuating the clutch, and a control unit, which can be designed and further developed as described above, for connecting and/or interrupting a hydraulic force between the pressure source and the clutch in response to electrical control signals output by the actuating electronics system. An installation space-saving and safe hydraulic module is rendered possible owing to the fact that the plug housing in the control unit forms a dielectric resistance between the clamping contact and the valve housing.

BRIEF DESCRIPTION OF THE DRAWINGS

In the following, the disclosure is explained by way of example with reference to the accompanying drawings using exemplary embodiments, wherein the features presented below can present an aspect of the disclosure both individually and in combination. In the drawings.

DETAILED DESCRIPTION

Figure 1:
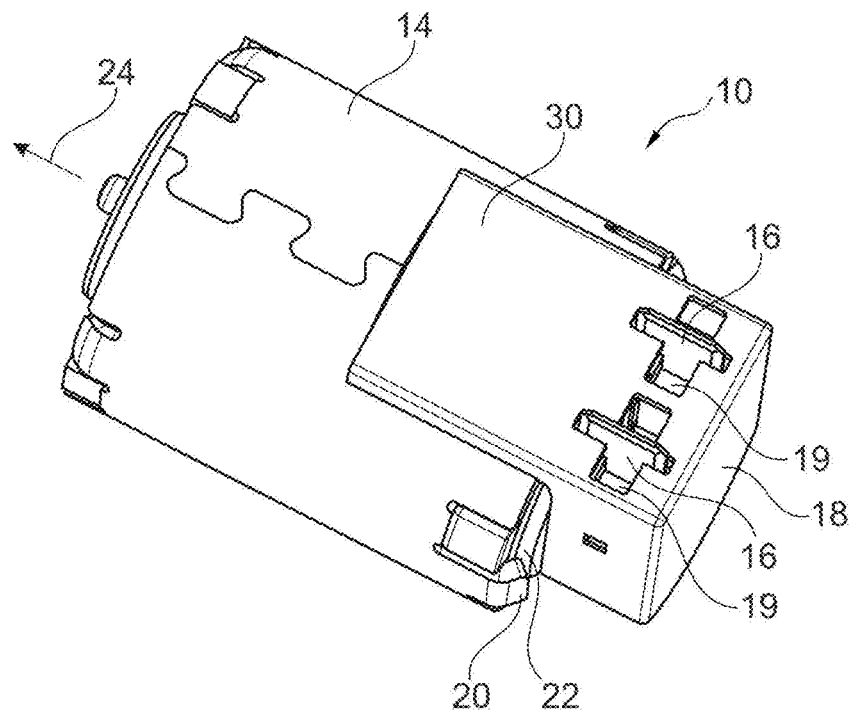
FIG. 1: shows a schematic perspective view of a valve unit.

The valve unit 10 shown in FIG. 1 can be used in an electrohydraulic control unit 12 for actuating motor vehicle assemblies, in particular a clutch in the drive train of a motor vehicle. The valve unit 10 has a metal valve housing 14 in which a solenoid valve can be received in a protected manner. This valve can be actuated electrically via connection contacts 16 (also referred to as first electrical contacts), for example to electromagnetically displace a valve slide so that a hydraulic connection between a hydraulic pressure source and a hydraulic consumer can be opened and/or closed. The connection contacts 16 are fixedly inserted in a plug housing 18 made of a non-conductive plastics material and are electrically connected to associated electrical connections of the valve. The connection contacts 16 are received in the plug housing 16 in a protected and electrically insulated manner, wherein the connection contact 16 is led out to the outside via a through-opening 19 in the plug housing 18. The plug housing 18 can be detachably or non-detachably fastened to the valve housing 14. In the exemplary embodiment shown, the valve housing 14 has plastically bent-over tabs 20, with the aid of which a projecting fastening edge 22 of the plug housing 18 is fastened to the valve housing 14 in a captive manner, in particular by flanging.

Figure 2:
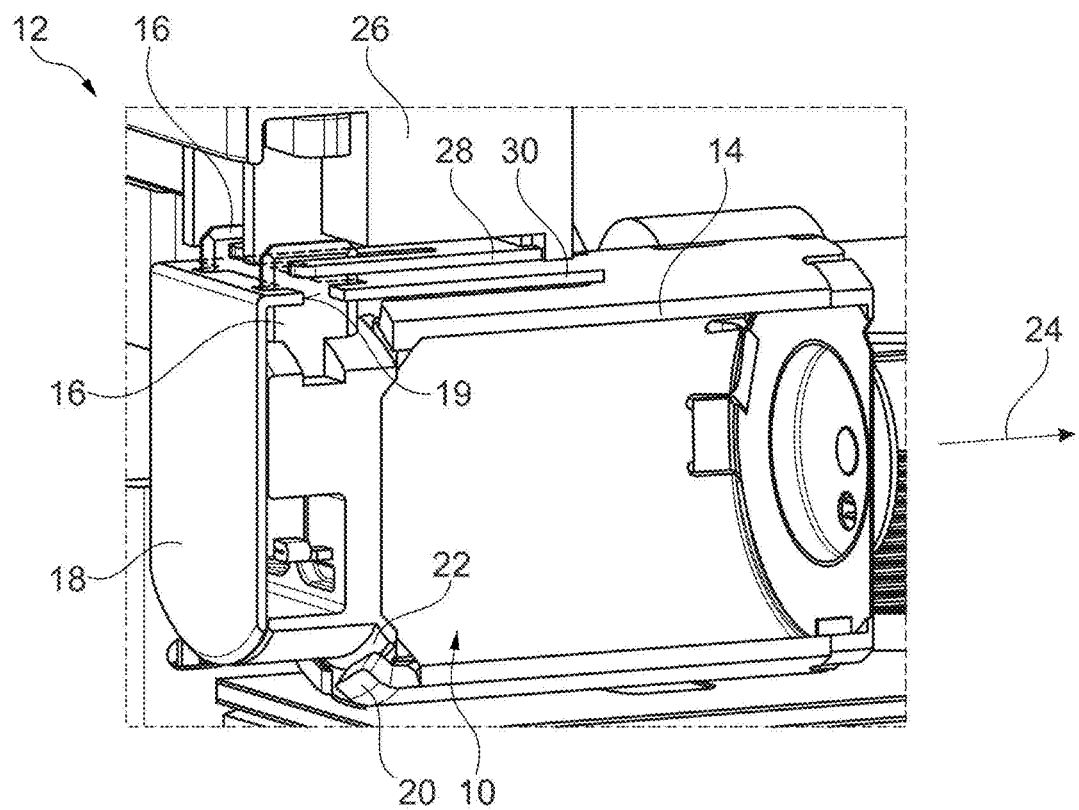
FIG. 2: shows a schematic perspective sectional view of a control unit with the valve unit from FIG. 1.

The valve housing 14 has a substantially circular-cylindrical shape and can be inserted in an insertion direction 24, which corresponds to the axial direction of the valve housing 14, together with the plug housing 18 into a corresponding receiving pocket of a main housing 26 of the control unit 10, as indicated in FIG. 2. On an underside of the main housing 26 facing the valve housing 14, clamping electrical contacts 28 (also referred to as second electrical contacts) are provided, each having a groove open in a U-shape counter to the insertion direction 24, into which the associated connection contact 16 can be automatically threaded and clamped when the valve unit 10 is assembled with the main housing 26.

The plug housing 18 has an integrally formed insulating extension 30 projecting in the insertion direction 24, which is arranged between the metal valve housing 14 and the metal clamping contacts 28 when the valve unit 10 is installed in order to form a dielectric resistance between the valve housing 14 and the clamping contacts 28. The insulating extension 30, as viewed in the radial direction of the valve housing 14, completely covers the clamping contacts 28 and projects laterally beyond the clamping contacts 28 so that the material of the plug housing 18 in the region of the projecting insulating extension 30 provides a high dielectric resistance to a voltage breakdown and/or a short circuit between the clamping contacts 28 and the valve housing 14.

LIST OF REFERENCE SYMBOLS

10 Valve unit
12 Control unit
14 Valve housing
16 Connection contact
18 Plug housing
19 Through-opening
20 Tab
22 Fastening edge
24 Insertion direction
26 Main housing
28 Clamping contact
30 Insulating extension

The invention claimed is:

1. A control unit for electrohydraulic actuation of motor vehicle clutches, comprising:
a main housing, and
at least one valve unit configured to be inserted into the main housing, the at least one valve unit having:
a metal valve housing configured for receiving an electrically actuated valve,
a plug housing fastened to the metal valve housing and formed from a plastic material, and
a first electrical contact disposed in the plug housing and configured to be electrically connected to the electrically actuated valve, and
a clamping electrical contact, configured for electrically connecting the first electrical contact of the at least one valve unit to an actuating electronics system configured for operating the electrically actuated valve, connected to the main housing, and
the plug housing forms a dielectric resistance between the clamping electrical contact and the metal valve housing, the plug housing extending at least over an entire projection surface of the clamping electrical contact onto the metal valve housing along a surface of the main housing normal to an outer side of the metal valve housing.

2. The control unit according to claim 1, wherein the plug housing further comprises a projecting insulating extension guided along a second outer side of the metal valve housing, the projecting insulating extension configured for forming the dielectric resistance between the clamping electrical contact and the metal valve housing.

3. The control unit according to claim 2, wherein the projecting insulating extension is formed integrally with the plug housing.

4. The control unit according to claim 2,
wherein the projecting insulating extension has a through-opening configured for a passage of the first electrical contact outside of an extension of the metal valve housing perpendicular to an insertion direction of the at least one valve unit into the main housing.

5. The control unit according to claim 2, wherein the projecting insulating extension arranged between the clamping electrical contact and the metal valve housing is configured to be inserted into the main housing via a movement of the projecting insulating extension relative to the clamping electrical contact in an insertion direction of the valve unit.

6. The control unit according to claim 2, wherein the projecting insulating extension is arranged radially between the metal valve housing and the main housing.

7. The control unit according to claim 1, wherein the plug housing is securely engaged to the metal valve housing via plastic deformation of the metal valve housing.

8. The control unit according to claim 1, wherein the clamping electrical contact has a groove open in a U-shape for receiving the first electrical contact, and the groove of the clamping electrical contact is open counter to an insertion direction of the valve unit into the main housing and the first electrical contact extends outside of the plug housing substantially perpendicular to the insertion direction.

9. A hydraulic module for hydraulic actuation of a clutch in a drive train of a motor vehicle, the hydraulic module comprising:
 a hydraulic pressure source for actuating the clutch,
 the actuating electronics system for processing signals for actuating the clutch, and
 the control unit according to claim 1 for connecting and/or interrupting a hydraulic force between the hydraulic pressure source and the clutch in response to electrical control signals output by the actuating electronics system.

10. The control unit according to claim 1, wherein the metal valve housing has a cylindrical outer side, and the plug housing extends in a circumferential direction of the cylindrical outer side and the clamping electrical contact extends substantially tangential to the plug housing.

11. The control unit according to claim 1, wherein the plug housing is securely engaged to the metal valve housing via flanging of a fastening edge of the plug housing.

12. A control unit for electrohydraulic actuation of motor vehicle clutches, comprising:
 a main housing, and
 at least one valve unit configured to be inserted into the main housing, the at least one valve unit having:
  a metal valve housing configured for receiving an electrically actuated valve,
  a plug housing fastened to the metal valve housing and formed from a plastic material, and
  a first electrical contact disposed in the plug housing and configured to be electrically connected to the electrically actuated valve, and
 a clamping electrical contact, configured for electrically connecting the first electrical contact of the at least one valve unit to an actuating electronics system configured for operating the electrically actuated valve, connected to the main housing, and
 the plug housing forms a dielectric resistance between the clamping electrical contact and the metal valve housing, and
 the metal valve housing has a cylindrical outer side, and the plug housing extends in a plane tangential to the cylindrical outer side and substantially parallel to the clamping electrical contact.

13. A control unit for electrohydraulic actuation of motor vehicle clutches, comprising:
 a main housing, and
 at least one valve unit configured to be inserted into the main housing in a first direction, the at least one valve unit having:
  a metal valve housing configured for receiving an electrically actuated valve,
  a plug housing fixed to an end of the metal valve housing and formed from a plastic material, and
  two first electrical contacts secured to the plug housing and configured to be electrically connected to the electrically actuated valve, and
 a clamping electrical contact, configured for electrically connecting the first electrical contacts of the at least one valve unit to an actuating electronics system configured for operating the electrically actuated valve, connected to the main housing, and
 the plug housing forms a dielectric resistance between the metal valve housing and the two first electrical contacts, and
 the two first electrical contacts extend outside of the plug housing substantially perpendicular to the first direction of the at least one valve unit into the main housing.

14. The control unit according to claim 13, wherein:
 the main housing further comprises a second clamping electrical contact configured to receive one of the two first electrical contacts, and
 the metal valve housing is cylindrical and the plug housing extends so as to completely cover the two clamping electrical contacts when viewed in a radial direction of the metal valve housing.

15. The control unit according to claim 13, wherein;
 the main housing further comprises a second clamping electrical contact configured to receive one of the two first electrical contacts, and
 each of the two clamping electrical contacts are formed with a groove having an open end configured to receive a corresponding one of the two first electrical contacts when the at least one valve unit is inserted into the main housing in the first direction.

16. The control unit according to claim 13, wherein the plug housing includes two through-openings and each one of the first electrical contacts extends through a corresponding one of the two through-openings.

17. The control unit according to claim 13, wherein the plug housing is fixed to the end of the metal valve housing via plastically deformed tabs of the metal valve housing.

18. The control unit according to claim 17, wherein the plastically deformed tabs are configured to securely engage a fastening edge of the plug housing.

19. The control unit according to claim 13, wherein the plug housing is configured to project over a longitudinal outer side of the metal valve housing.

* * * * *